(12) United States Patent
Bretz

(10) Patent No.: US 10,549,929 B2
(45) Date of Patent: Feb. 4, 2020

(54) CONVEYING FACILITY

(71) Applicant: WRH Walter Reist Holding AG, Ermatingen (CH)

(72) Inventor: Markus Bretz, Herrliberg (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 0 days.

(21) Appl. No.: 16/110,054

(22) Filed: Aug. 23, 2018

(65) Prior Publication Data

US 2019/0062075 A1  Feb. 28, 2019

(30) Foreign Application Priority Data

Aug. 28, 2017  (CH) ..................................... 01061/17

(51) Int. Cl.
| | |
|---|---|
| B65G 47/96 | (2006.01) |
| B65G 11/02 | (2006.01) |
| B65G 17/24 | (2006.01) |
| B65G 17/06 | (2006.01) |
| B65G 47/26 | (2006.01) |

(52) U.S. Cl.
CPC .......... B65G 47/962 (2013.01); B65G 11/023 (2013.01); B65G 17/066 (2013.01); B65G 17/24 (2013.01); B65G 47/261 (2013.01); *B65G 2201/0285* (2013.01)

(58) Field of Classification Search
CPC .... B65G 17/24; B65G 17/066; B65G 17/065; B65G 47/26; B65G 47/261; B65G 47/28; B65G 47/962
USPC .................................................. 198/778, 779
See application file for complete search history.

(56) References Cited

U.S. PATENT DOCUMENTS

| 3,034,665 A | 5/1962 | Speaker | |
|---|---|---|---|
| 3,690,433 A * | 9/1972 | Buldini | B65G 17/24 198/345.3 |
| 5,018,928 A * | 5/1991 | Hartlepp | B65G 47/962 104/290 |

(Continued)

FOREIGN PATENT DOCUMENTS

| CH | 710608 | 7/2016 |
|---|---|---|
| EP | 1 719 721 | 4/2013 |

(Continued)

OTHER PUBLICATIONS

Switzerland Search Report dated Nov. 13, 2017, Application No. 01061/17, 3 pages.

*Primary Examiner* — Mark A Deuble
(74) *Attorney, Agent, or Firm* — Rankin, Hill & Clark LLP

(57) ABSTRACT

A conveying facility with a drivable conveying member that forms a sheet-like main surface that faces the conveyed item and defines a conveying stretch. The conveying member includes at least one conveying element that forms at least a part of the main surface. The conveying member also includes rollers that, via roller holders, are rotatably mounted on the at least one conveying element about roller pivots and can selectively assume the state of a freewheel position, an arrested position or a drive position. The conveying facility also has at least one conveying container that lies on the conveying member in a connection-free manner, wherein the rollers project at least partly beyond the main surface of the conveying element so that the at least one conveying container lies on the rollers.

33 Claims, 11 Drawing Sheets

(56) References Cited

U.S. PATENT DOCUMENTS

| | | | |
|---|---|---|---|
| 5,353,912 A | 10/1994 | Killer et al. | |
| 5,632,589 A * | 5/1997 | Bray | B61B 13/04 198/349.6 |
| 5,676,514 A * | 10/1997 | Higman | B61B 13/04 198/349 |
| 8,544,634 B2 * | 10/2013 | Fourney | B65G 47/29 198/779 |
| 8,857,625 B1 * | 10/2014 | Oropeza | B07B 13/04 198/370.03 |
| 2006/0011453 A1 * | 1/2006 | Sedlacek | B65G 15/60 198/779 |
| 2009/0250321 A1 * | 10/2009 | Krisl | B65G 17/24 198/779 |
| 2010/0025190 A1 * | 2/2010 | Balk | B65G 17/002 198/426 |
| 2017/0369251 A1 | 12/2017 | Weber et al. | |

FOREIGN PATENT DOCUMENTS

| | | |
|---|---|---|
| EP | 2 962 964 | 1/2016 |
| FR | 2 742 425 | 6/1997 |
| WO | 2007/000440 | 1/2007 |
| WO | 2013/075714 | 5/2013 |
| WO | 2015/073191 | 5/2015 |
| WO | 2015/121306 | 8/2015 |
| WO | 2017/076541 | 5/2017 |
| WO | 2017/085203 | 5/2017 |

* cited by examiner

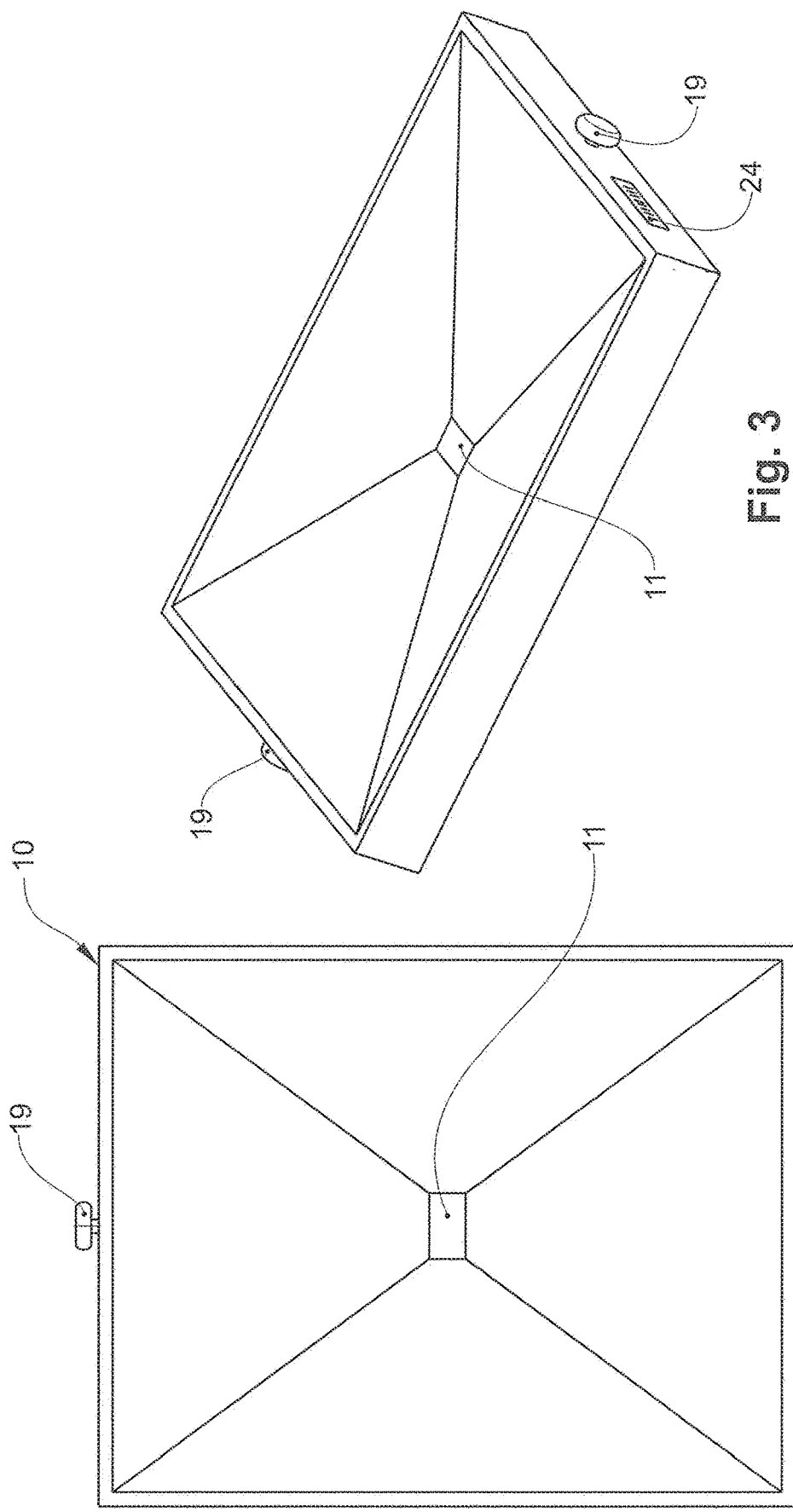

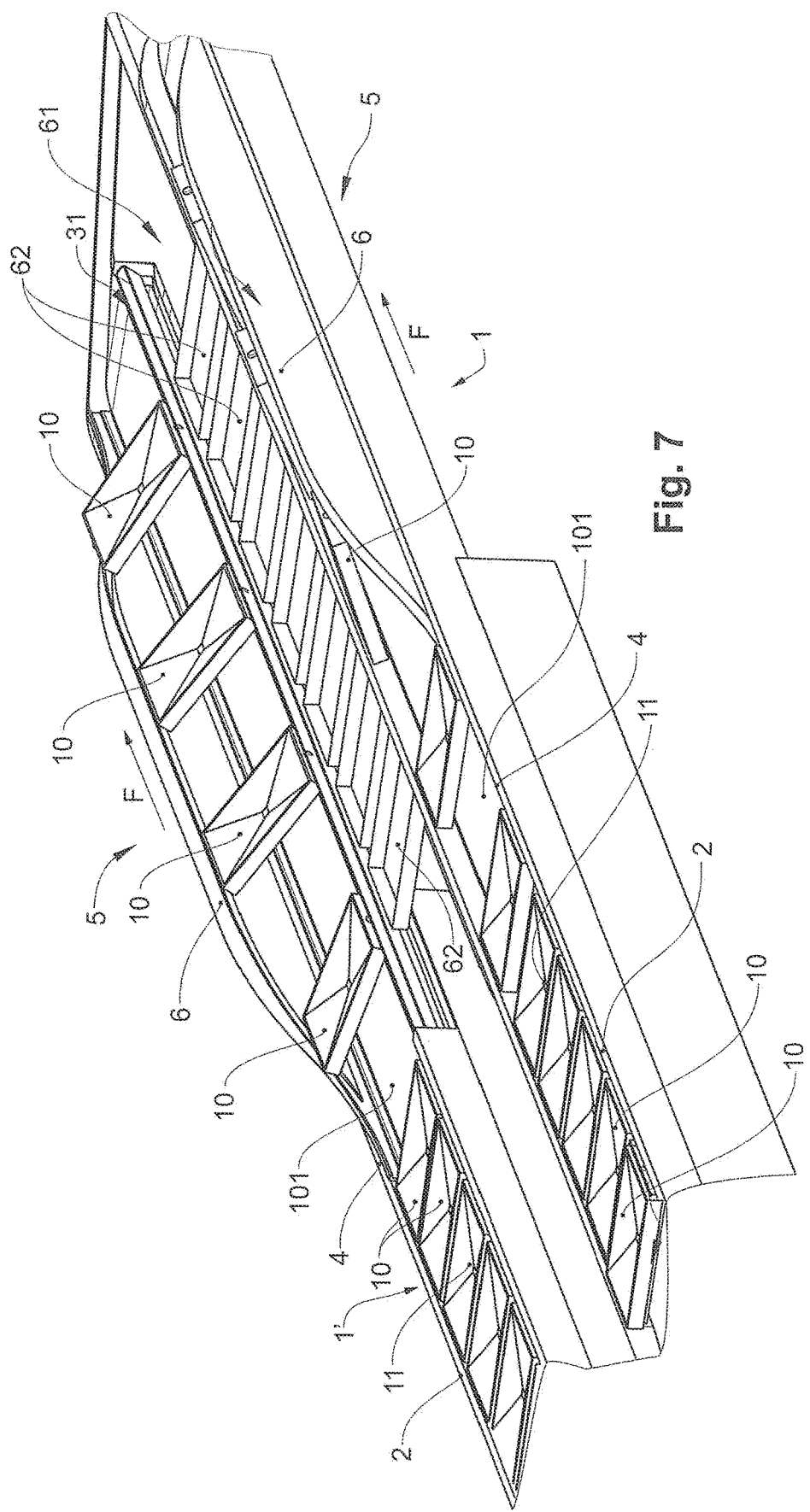

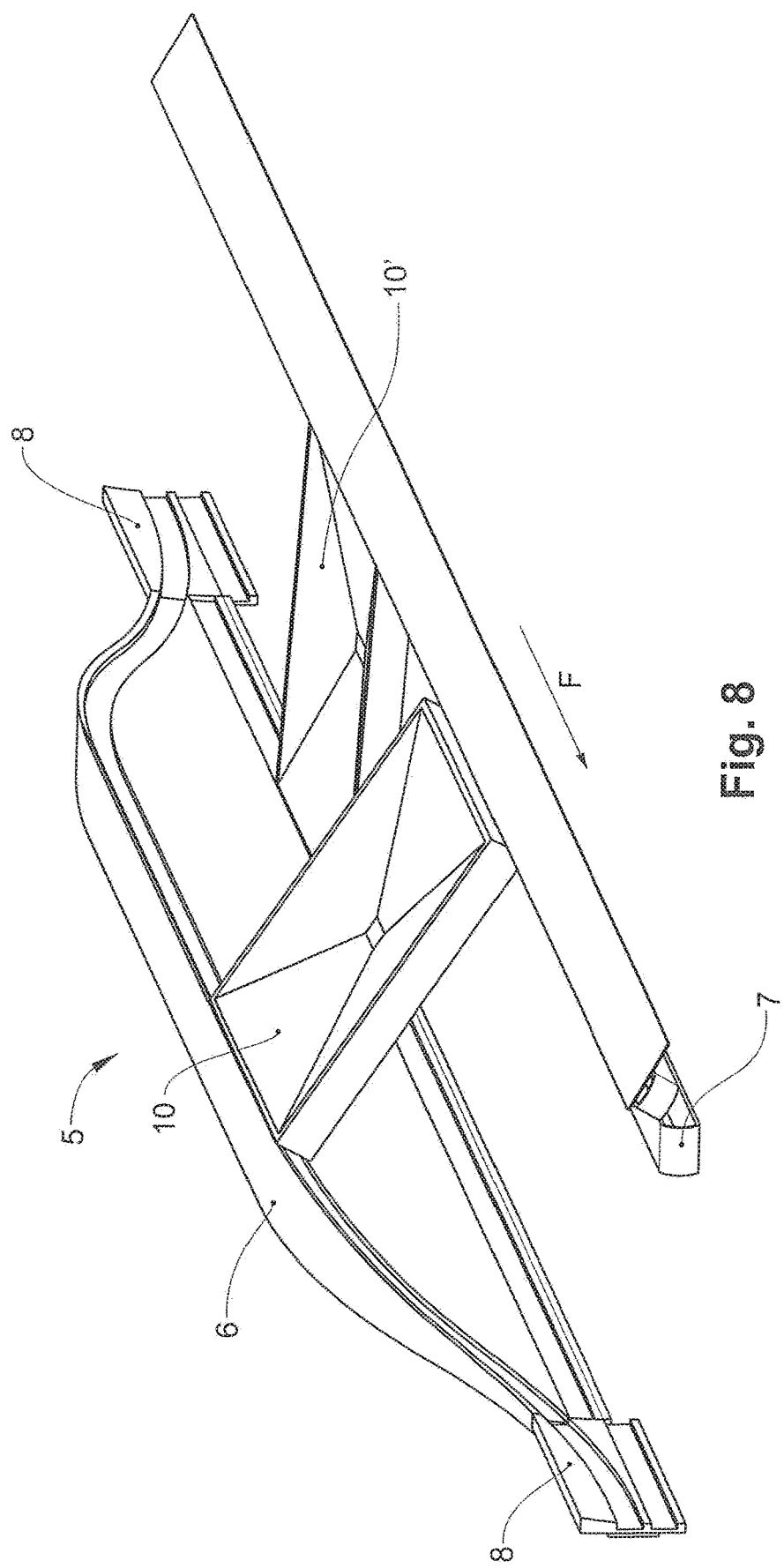

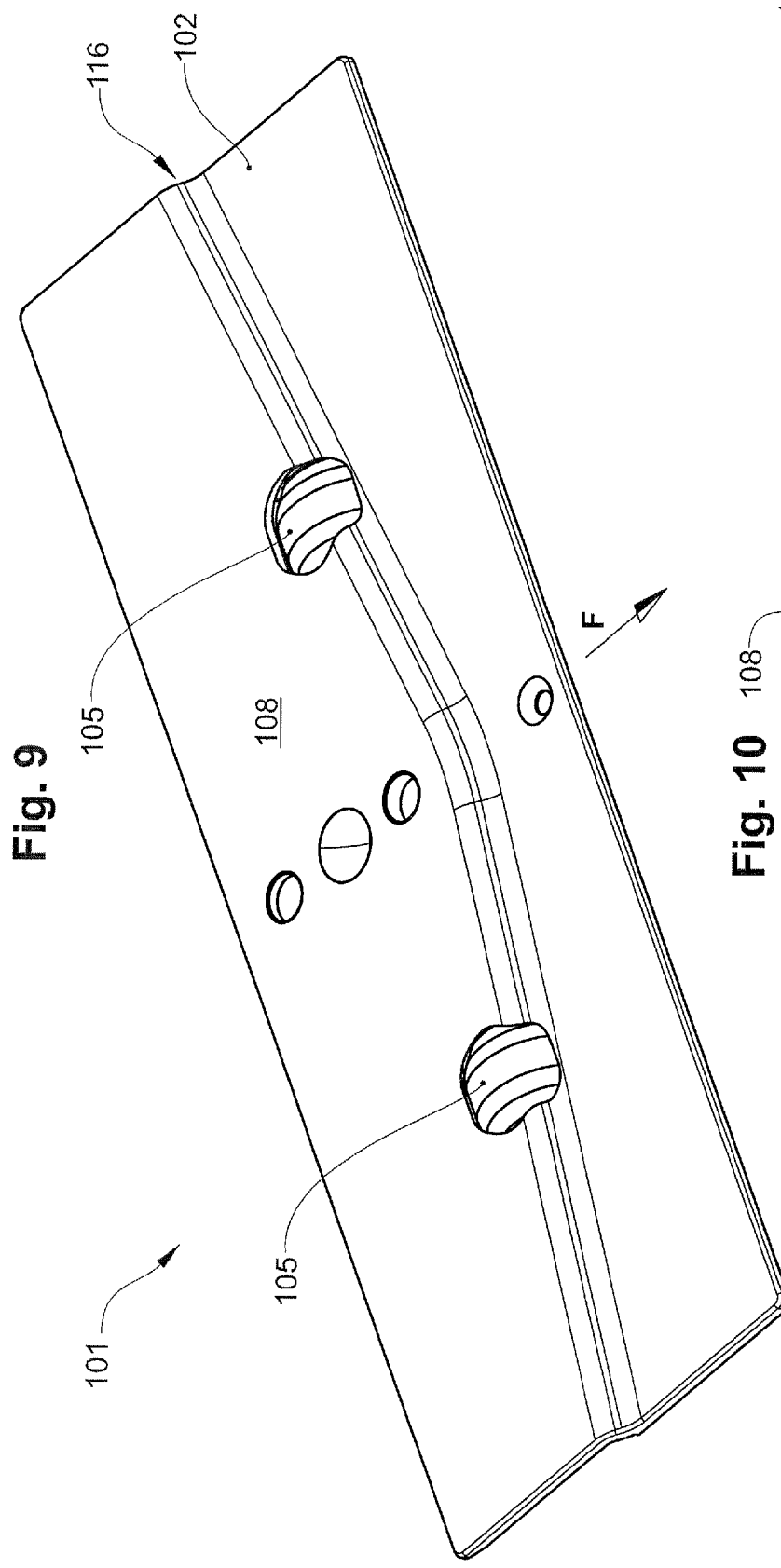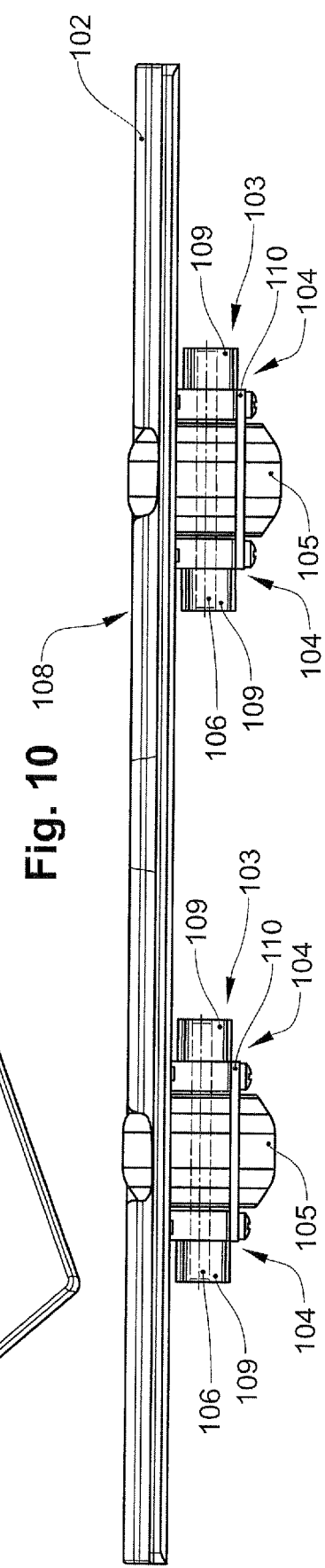

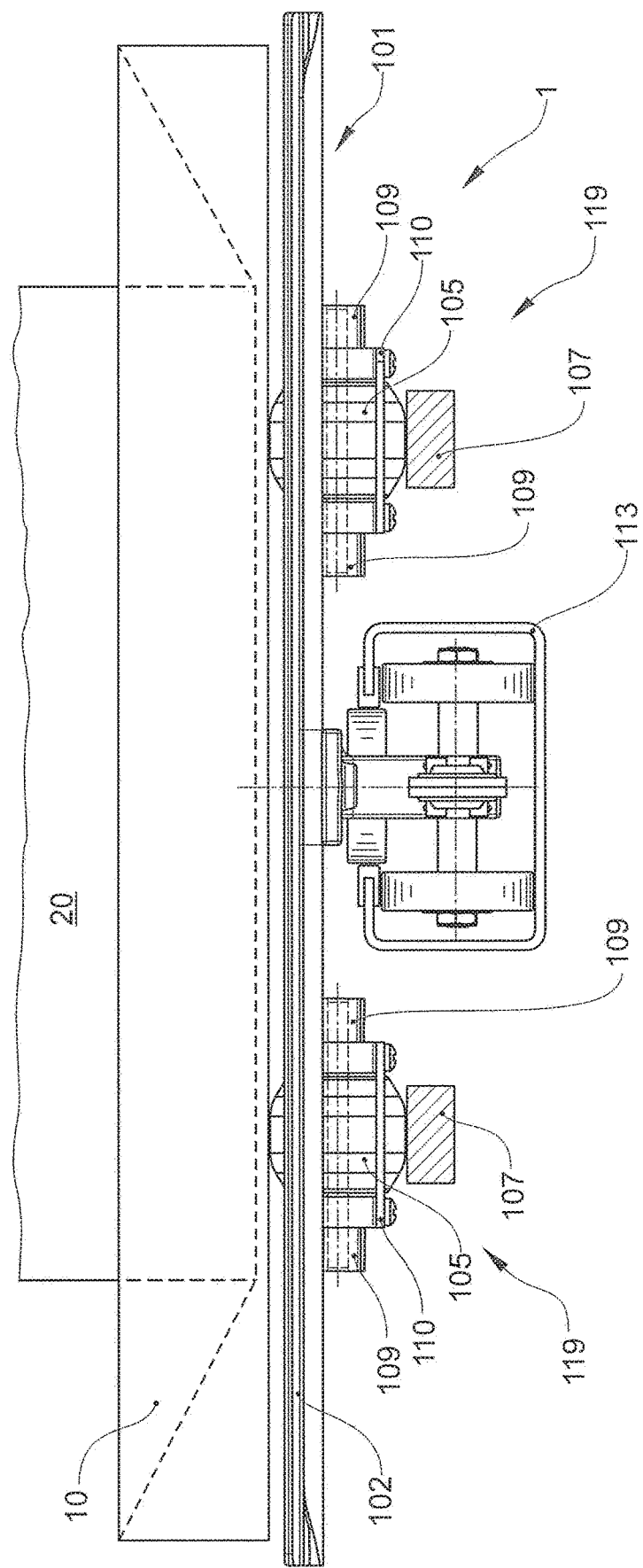

CONVEYING FACILITY

BACKGROUND OF THE INVENTION

Field of the Invention

The invention lies in the field of conveying technology and relates to a conveying facility as well as to a conveying system, including the conveying facility, and to a method for operating the conveying facility.

Description of Related Art

Increasing quantities of conveyed goods mostly in the form of parcels are processed in handling centers due to the increasing online trade. The massive quantities of conveyed goods or items are a huge challenge to the handling centers. Indeed, the conveyed items are to be processed in the handling centers as quickly as possible, so that these reach their addressee as soon as possible.

The arriving conveyed items are fed into sorting and distribution systems in the handling centres. In one of the first steps, the identification information that is arranged on the conveyed item is detected, which is to say acquired, and such information permits the assignment of the conveyed item to the mailing locality.

This mailing locality can be, e.g., a country, a region, a district, a town, a street or a complete address of an addressee.

One of the main tasks of the handling centers is to sort the conveyed items according the mailing localities by way of so-called sorters and to group them into groups, which correspond to the mailing localities.

Thus, for example, so-called tilt-tray sorters that form a conveying system for the transport and sorting of conveyed items by way of tiltable conveying trays are known. Concerning tilt-tray sorters, the conveyed items are conveyed in tilt-trays past delivery locations. As soon as the conveyed item has reached the correct delivery location, the tilt-tray is brought into an oblique position via a tilting mechanism and the conveyed items slide laterally over the conveying tray to a take-over appliance.

The tilt-trays are arranged on a travel mechanism. The travel mechanism can consist of conveying elements that are linked to one another and can be slidingly or rollingly guided along an underlay, in particular along a guide rail, via sliding elements or runner rollers.

Such a tilt-tray sorter is described for example in the publication document U.S. Pat. No. 5,632,589.

The publication documents WO 2017/076541 A1 and WO 2013/075714 A1 each describe a sorting mechanism with tiltable conveying stretch segments for sorting parcels or pieces of luggage.

The publication document EP 1 719 721 B1 describes a sorting appliance with an inclining appliance for tilting the conveying member with the conveying container, for the purpose of delivery of the products out of the conveying containers.

Despite the fact that the degree of automation is large in such handling centers, certain working steps are still carried out manually.

This is the case for example with conveyed items which, due to special characteristics, such as e.g. their geometry, shape or structure cannot be brought into conventional fully automated processing process.

In contrast, these particular conveyed items must be processed separately and fed to a sorter. The feeding of the conveyed items into the processing process as a rule is effected manually from transport containers or holding containers.

However, before such conveyed items can be fed to a sorter, identification information, which permits the mailing locality necessary for the sorting to be determined, must be determined from these items via a detecting device.

The detection (acquisition) of the identification information is therefore effected in a conveying facility that is designed as a supply conveyor and to which the conveyed items are manually fed.

Since the conveyed items can be shapeless, e.g. roundish, (tilt away or roll away from the conveying track) as well as include packaging strings/cords (danger of entanglement with the conveying member) and can include exposed adhesive surfaces of adhesive tapes (sticking to the conveying member), these items are conveyed in the conveying facility in particular in conveying trays. The conveying trays shield the conveyed items from the convening member and further provide these with an encompassing lateral retention.

After a successful identification, the conveyed items are conveyed into a delivery region of the conveying facility, for the purpose of transfer to a take-over appliance.

SUMMARY OF THE INVENTION

It is then the object of the present invention to propose a conveying facility which permits the implementation of working steps on the conveyed item, such as detecting identification information and which is designed to transfer the conveyed items to a take-over appliance.

According to a further object, the conveying facility is to permit the conveyed items to be conveyed at the conveying speed of a conveying member that extends along a conveying stretch (conveying section or conveying path) and in defined conveying stretch sections to convey it at a speed that is different compared to the conveying speed of the co-moved conveying member or even to stop it.

The conveying facility includes a conveying member that can be driven along a conveying stretch for conveying conveyed items.

In particular, the conveying member is driven in a continuous manner during the conveying operation.

In particular, the conveying member is guided in a circulating manner, so that the conveying facility forms a closed conveying stretch.

The conveying member forms a sheet-like (web-like) main surface that faces the conveyed item and defines the conveying stretch.

In particular, the main surface defines a separating surface between the conveying containers that are conveyed at the top and the facility parts such as roller holders, sub-support, guide channel or drive body, which are arranged at the bottom.

The main surface, for example, prevents objects from being able to fall through intermediate spaces between the rollers. The main surface also serves for the operational reliability/safety, since no or only small gaps exist between the conveying elements and the risk of jamming, snagging or the dragging-away is reduced.

Furthermore, the conveying member includes at least one conveying element. In particular, the at least one conveying element is designed in an extensive manner, which is to say as an extensive element. In particular, the main surface is designed from a surface of the at least one conveying element that faces the conveyed item.

In particular, the conveying member includes several conveying elements that are arranged along the conveying stretch and which, in particular form the sheet-like main surface. The conveying elements can overlap one another in the conveying direction.

The conveying member further includes rollers that are arranged on the at least one conveying element via roller holders and are rotatably mounted about roller pivots (axles).

The rollers can selectively assume the state (condition) of an arrested position or a drive position via the roller holders.

The rollers can selectively assume the state of a freewheel position, an arrested position or a drive position via the roller holders.

The conveying facility then includes at least one conveying container that lies on the conveying member in a connection-free manner, for receiving a conveyed item.

In particular, the conveying container forms a deepening, e.g. a concave depending, for receiving the conveyed item. In particular, the conveying container is open to the top. The conveying container can be a conveying crate, a conveying dish or, in particular, a conveying tray.

The rollers of the conveying member project at least partly beyond the main surface of the conveying element, so that the at least one conveying container lies on the rollers or their running surfaces. In particular, the rollers project through openings in the conveying element. The conveying container can lie partly or, in particular, completely on the rollers.

The roller holders and the rollers are each part of a roller mechanism. The different states of the rollers in particular are then created by active elements that act upon the roller mechanism.

Herein, the rollers are rotatably mounted in the roller holder, in particular about a physical roller pivot.

Active elements with regard to the freewheel position can be actuating means which, during the movement of the conveying member, move the rollers in a freewheel position or hold them in this. In particular, the actuating means are arranged below the main surface or below the at least one conveying element. In particular, the actuating means act upon the roller mechanism from below.

In particular, the actuating means are arranged in the conveying facility in a locally fixed, i.e. stationary manner. This means that the actuating means do not move with the conveying member along the conveying stretch.

In particular, the actuating means are cam guides, along which the conveying member is moved with the roller mechanisms. The actuating means can also be cams that can be engaged and disengaged, so that the rollers can be selectively brought into a freewheel position along a certain conveying stretch.

The actuating means can act upon the physical roller pivots, for example in a direct or indirect manner, and therefore bring the rollers into a freewheel position or hold them in this. The actuating means can therefore effect a displacement of the rollers into a freewheel position by way of a direct or indirect force action upon the physical roller pivots. "Indirect" means that the actuating means can act, e.g., also upon a pivot holder, in which the physical roller pivots are held.

In particular, the mentioned actuating means are applied along accumulation stretches.

Active elements with respect to the drive position can be roll guides that drive the rollers during the movement of the conveying member along the conveying stretch.

In particular, the roll guide or its roll surface is arranged below the main surface or below the at least one conveying element. In particular, the roll surface runs parallel to the main surface of the conveying member.

In particular, the roll guides form a roll surface that bears on the running surfaces of the rollers from below. In particular, the roll guide is arranged in the conveying facility in a locally fixed, i.e. stationary manner. I.e., the roll guide is not co-moved with the conveying member along the conveying stretch. The roll guide can be engaged and disengaged, so that the rollers can be selectively driven along a certain conveying stretch.

In the drive position, the rollers roll along the roll surface of the roll guide by way of the conveying movement of the conveying member along the conveying stretch in the conveying direction and are therefore passively driven by the roll guide.

Since the rollers roll on the roll guide at the speed of the conveying member and the tangential movement direction of the running surfaces at the contact location of the conveying containers is directed in the conveying direction, the conveying containers that lie on the passively driven rollers are moved in the conveying direction at twice the speed of the conveying member.

In particular, the roll surface runs below the main surface or the at least one conveying element parallel to the main surface of the conveying member.

According to a further development of the roll guide, this, instead of a stationary roll surface, includes a driven roll element with a correspondingly moved roll surface, such as e.g. a drive belt or drive band which are driven in a circulatory manner. The roll surface of the roll element can be driven counter to the conveying direction. The roll surface of the roll element can also be driven in the conveying direction.

The rollers which bear on the driven roll element can now be additionally driven in the clockwise direction or counter to this, by way of the driven roll element. The conveying containers can be driven at an arbitrary speed independently of the speed of the conveying member by way of this.

If, for example, the roll surface of the roll element is driven counter to the conveying direction, then this effects an additional acceleration of the conveying container in the conveying direction.

If, for example, the roll surface of the roll element is driven in the conveying direction, then this effects a slowing-down of the conveying container in the conveying direction compared to a passive drive by the roll guide. Given a suitably high speed of the roll element, the conveying container can even be conveyed more slowly than the conveying speed or counter to the conveying speed of the conveying member.

This means that the acceleration of the conveying container along an acceleration stretch can also be negative compared to the conveying member.

In particular, the roll element is driven by a drive that is controlled via the control device.

In particular, the mentioned roll guides are applied along acceleration paths.

Active elements with respect to the arrested position can be the rollers themselves, which bring themselves into the arrested position or remain in this due to their intrinsic weight, i.e. by way of gravity.

The active elements can also be the conveying containers and/or the conveyed item, which with their resting weight bring the rollers into an arrested position or hold them in this.

For this, the roller holder can include an arresting element, on which the rollers bear due to their intrinsic weight and/or by way of the resting weight of the conveying container and/or of the conveyed item.

Herein, the arresting element and the roller form a friction contact that prevents a free rotation of the rollers. The friction contact therefore blocks the rotation of the rollers. In particular, the rollers can bear on the arresting element with their running surfaces.

Accordingly, the conveying containers are conveyed at the conveying speed of the conveying member in the arrested position of the rollers. Herein, the rollers act upon the conveying containers as catches (drivers/dogs).

In particular, the running surfaces of the rollers have a high coefficient of friction for this. This ensures a high static friction and sliding friction with the conveying containers that lie on these or with the arresting element. The roller can include, e.g., a running surface that is designed in a rubbered or rubberized manner.

In particular, the arrested position is applied along a feed stretch or generally in the case of an exclusive conveying operation.

According to a further development of the invention, the rollers are mounted in the roller holder in a manner such that these permanently project at least party beyond the main surface of the conveying element. Permanently means over the whole conveying stretch and in all three aforementioned states. This means that the roller mechanism envisages no roller position, in which the running surfaces of the rollers are arranged completely below the main surface.

The rollers are each movable in particular between at least two spatially different positions by way of active elements, as described above. In these positions, the rollers assume different states from the group of states, including the arrested position, the freewheel position and the drive position.

The movement between the at least two spatially different positions, in particular, includes a movement component transverse to the main surface.

According to a further development of the invention, the rollers are each movable perpendicularly to the main surface between at least two positions by way of the active elements. Accordingly, the rollers project beyond the main surface by a different amount between the at least two positions.

According to a further development of the roller mechanism, the at least one first spatial position can correspond to the arrested position.

According to a further development of the roller mechanism, the at least one second spatial position can correspond to the freewheel position.

According to a further development of the roller mechanism, the at least one second spatial position can correspond to the drive position.

According to a further development of the roller mechanism, the at least one second spatial position can correspond to the freewheel position as well as to the drive position.

The conveying element can be, for example, a plate-like element or a plate element. The conveying member can include several plate elements, which, in particular, overlap one another along the conveying stretch and be part of a plate conveyor.

In particular, the plate elements can be fastened to a drive body, e.g. to a pull body, which extends along the conveying stretch. The drive body and, via this, the plate elements are driven along the conveying direction via a drive device.

The drive body can be a jointed (linked) body such as, e.g., a drive chain. The drive body can be guided in particular in a rolling or sliding manner along a guide rail, in particular in a guide channel of a guide rail. The drive body can accordingly include runner rollers or sliding elements.

The conveying element can also be a module of a modular belt chain or mat chain, wherein the main surface is formed by the modular belt chain or mat chain. The conveying elements are accordingly connected to one another, in particular linked to one another.

Basically, the conveying element can also be a continuous conveying belt with through-openings for the rollers.

The conveying facility with the conveying member, which is described above, in particular forms a feed stretch, along which the conveying containers are charged or fed with discrete (piece) items, in particular fed in a manual manner. In particular, a suitable feed device is arranged along the feed stretch.

The feed device can be formed by one or more feed stations, which are arranged along the feed stretch. In the feed stations, the conveying containers are manually fed with conveyed items, e.g., from storage containers.

The conveying containers are moved along the feed stretch, in particular at the speed of the conveying member. This means that the rollers of the conveying member are located in an arrested position and act as catches.

As already mentioned above, the rollers assume the arrested position due to the intrinsic weight of the rollers or the resting pressure of the conveying containers or the conveyed items that are led along therein.

The roller holders and the rollers together with the active elements can form a movement mechanism, with which the at least one conveying container is movable relative to the conveying member. The active elements can be active elements with regard to the freewheel position and/or active elements with regard to the drive position and/or active elements with respect to the arrested position.

Considered in the conveying direction F, a detecting device that detects identification information, which is attached to the conveyed item, can be arranged subsequently to the feed stretch. The identification information, for example, permits the determining of the mailing locality, such as the address, of the conveyed item.

The detecting device can be an optical detection device, such as, e.g., a multi-side scanner that searches the conveyed item for identification information from several sides.

Considered in the conveying direction, a weighing device can likewise be arranged subsequently to the feed stretch and in particular subsequently to the detection device, by way of which weighing device the weight of the conveyed item can be determined. The weighing device can also be arranged upstream of the detection device.

Furthermore, considered in the conveying direction, a spiral stretch can be subsequent to the feed stretch and in particular subsequent to the detecting device and/or weighing device, along which spiral stretch the conveying containers are conveyed by the conveying member to a high conveying level.

Amongst other things, this spiral stretch serves for bridging the time until the control device of the conveying facility has determined a mailing locality from the identification information, which is determined at the detecting device, or has ascertained that no mailing locality can be determined for the conveyed item.

In particular, specifically one envisages the conveyed items only being conveyed into a delivery region when the processing of the identification information by the control device is completed.

Along the spiral stretch, the rollers of the conveying member in particular are in an arrested position and thus act as catches, which is to say drivers or dogs.

According to a further development of the conveying facility, this forms at least one accumulation stretch for buffering conveying containers.

In particular, the accumulation stretch is formed upstream of a delivery region, which is yet described further below.

In particular, the accumulation stretch is formed between a feed stretch and a delivery region.

In particular, considered in the conveying direction, the accumulation stretch is arranged subsequently to the aforementioned spiral stretch or to the detecting device and weighing device.

The rollers are located in the freewheel position along the accumulation stretch. In this manner, the conveying member can move past below the stationary conveying containers or those that are moved at a lower speed than the conveying member, without a sliding friction occurring between the conveying member and the conveying containers.

Accordingly, as already described above, actuating means can be arranged along the accumulation stretch, by way of which actuating means the rollers can be moved, e.g., out of an arrested position into a freewheel position or be able to be held in this.

The conveying member therefore moves through the accumulation stretch below the conveying containers.

Considered in the conveying direction, the conveying facility subsequently to the accumulation stretch in particular includes a release device for releasing individual conveying containers out of the accumulation stretch.

In particular, the release of the conveying containers is effected towards a delivery region of the conveying facility. The release is controlled, for example, via the control device of the conveying facility.

According to a further development of the conveying facility, the conveying facility includes an acceleration stretch.

Considered in the conveying direction, the acceleration stretch can be arranged subsequently to or directly subsequently to the accumulation stretch or to the release device.

Considered in the conveying direction, the acceleration stretch can be arranged upstream of or directly upstream of a delivery region. In particular, the acceleration stretch serves for positioning the conveying containers along the acceleration stretch upstream of the delivery region.

The conveying containers are accelerated with respect to the conveying member along the acceleration stretch via the rollers of the conveying member, which are located in the drive position.

The acceleration can be a positive or negative acceleration. This means that the conveying containers along the acceleration stretch can be (positively) accelerated or delayed with respect to the conveying member.

Along the acceleration stretch, the conveying containers at least in sections in particular have a different, in particular higher conveying speed, in particular double the conveying speed compared to the conveying member.

According to a particular embodiment, the conveying containers can be conveyed along the acceleration stretch at a variable speed, which is independent of the conveying member.

The rollers of the conveying member are accordingly passively or actively driven along the acceleration stretch via a roll guide.

For the active driving of the rollers along the acceleration stretch, the roll guide can include a roll element, which is actively drivable via a drive and on which the rollers roll.

The drive surface of the roll element can be driven counter to the conveying direction and possibly also in the conveying direction. The roll element, which in particular is variably drivable by way of a drive via the control device, has already been described further above.

Along the acceleration stretch, the rollers are therefore moved into the drive position or held in this by way of the roll guide. The drive position can be assumed, e.g., from an arrested position or from a freewheel position.

The conveying member therefore likewise moves through the acceleration stretch, below the conveying containers.

As already mentioned, along the conveying stretch, the conveying facility forms a delivery region with a delivery device for delivering conveyed items to a take-over appliance.

In particular, the delivery region is defined by the active region of the delivery device along the conveying stretch.

Considered in the conveying direction, the delivery region connects onto an acceleration stretch, in particular in a direct manner.

The conveying containers, which lie on the conveying member, can now be fed along the acceleration stretch to the delivery region via the rollers at a speed that is different to the conveying speed of the conveying member.

In particular, the take-over appliance can be an outgoing conveyer, sometimes also called conveying away conveyor. In particular, the outgoing conveyor can likewise include conveying containers.

The conveying tracks of the conveying facility and of the outgoing conveyor in particular run parallel to one another along the delivery region and in particular also along the acceleration stretch. The conveying directions of both conveyors in particular are directed equally in the delivery region and in particular also along the acceleration stretch. The mentioned conveying tracks in particular run in a straight line along the delivery region and in particular also along the acceleration stretch.

The acceleration stretch now permits the conveying containers of the conveying facility to be brought into a cyclically synchronous (pace-synchronous) conveying with the conveying containers of the outgoing conveyor, wherein in particular pairings of conveying containers, which are arranged next to one another, are formed in the delivery region for the purpose of delivery of the conveyed items.

In particular, the conveying containers of the outgoing conveyor are moved along a conveying stretch that runs parallel to the delivery region and, in particular, also one that runs parallel to the acceleration stretch, in a manner in which they are uniformly spaced from one another.

The outgoing conveyor can be, for example, a tilt-tray conveyor. The tilt-tray conveyor can be part of a sorter, in particular a tilt-tray sorter.

According to a particular embodiment, the conveying facility can form a plurality of delivery regions which are arranged one after the other in the conveying direction along the conveying stretch. The delivery regions can be designed as has already been described elsewhere and include suitable delivery devices such as, e.g., described further below.

An accumulation stretch, possibly with a release device, according to the construction, arrangement and manner of functioning, which have already been described elsewhere, can be arranged upstream of each delivery region in the conveying direction.

An acceleration stretch according to a construction, arrangement and manner of functioning, which have already been described elsewhere, can be arranged upstream of each delivery region in the conveying direction. The acceleration stretch can possibly be combined with the mentioned accumulation stretch, as has already likewise been described elsewhere.

In particular, the conveying facility according to the aforementioned embodiment can be a sorter.

The delivery device can include an inclining mechanism for the inclining or tilting or oblique positioning of conveying containers which is lateral considered in the conveying direction F, for the purpose of the delivery of conveyed items to a take-over appliance.

The conveying containers are lifted at one side, in particular at a short side, by way of the inclining mechanism. This can be effected via a suitable cam guide of the inclining mechanism.

The inclining mechanism at least partly and in particular completely lifts the conveying containers from the conveying member. The conveying member moves on in the conveying direction along the inclining mechanism in particular below the lifted conveying container.

Accordingly, the conveying containers can be conveyed above, which is to say over the conveying member, by way of the inclining mechanism. In the lifted position, the conveying containers along the inclining mechanism in particular are decoupled from the conveying movement of the conveying member.

The inclining mechanism can include a conveying drive, by way of which the lifted conveying containers can be conveyed in the conveying direction independently of the conveying member. The conveying drive can include drive belts.

The conveying containers are then lifted in the delivery region by way of the inclining mechanism, for example at one side, and are brought into an oblique position. By way of this, the conveyed item slips in the direction of the take-over appliance, e.g. onto a conveying container of an outgoing conveyor.

Subsequently to the delivery of the conveyed item, the inclining mechanism, in particular its cam guide, can move the conveying container back again onto the conveying member by way of lowering and negating the oblique position.

The delivery device or the inclining mechanism can include a diverter, which interacts with the control device and via which the conveying containers can be selectively brought into an oblique position by the inclining mechanism or—without an oblique position—can be conveyed further on the conveying member, for the purpose of the selective delivery of the conveyed items.

The conveying member is likewise moved through the delivery region below the conveying containers.

The conveying facility can include an additional delivery device, in which all conveying containers, which have not yet been emptied, are emptied. In other words, conveyed items from all those conveying containers, in which conveyed items are still located upstream of the additional delivery device, are delivered in this additional delivery device.

Subsequently to the delivery region, the conveying containers are conveyed in the conveying direction along the conveying stretch in particular back again into the feed stretch.

In a further development of the invention, an accumulation stretch can be formed between the delivery region and the feed stretch, considered in the conveying direction. The accumulation stretch permits the controlled conveying of conveying containers into the feed stretch.

The conveying facility can form side guides laterally of the conveying member considered in the conveying direction. These are to prevent a slipping of the conveying containers away from the conveying member, in particular in the spiral stretch.

The invention further relates to a conveying system including a conveying facility according to the above description as well as to a take-over appliance, likewise according to the above description, wherein the conveying facility is designed as a feed conveyor of the take-over appliance. In particular, the conveying facility is a supply conveyor for the take-over appliance.

The conveying facility and the take-over appliance form a transfer region for transferring conveyed items from the conveying facility onto the take-over appliance. Herein, the delivery region of the conveying facility is part of the transfer region.

As already mentioned, the take-over appliance in particular is a further conveying facility which is to say an outgoing conveyor.

The invention furthermore also relates to a method for the delivery of conveyed items from the conveying facility according to the above description onto a take-over appliance, likewise according to the above description.

According to the method, the conveying containers, which lie on the conveying member in a connection-free manner, are buffered along an accumulation stretch and are individually released into the acceleration stretch via a release device and are accelerated over the acceleration stretch towards the delivery region at a speed that is different from the conveying speed of the conveying member.

In particular, the conveyed items are discrete (piece) items. The conveyed items in particular are parcels. The conveyed items can also be pieces of luggage. Conveyed items in a conveying tray can include one or more individual pieces. The conveyed items can be multi-part packages, stacks, compositions, dispatch groups and the like.

In particular, the present invention is applied in handling centers of parcel services, in distribution centers or in distribution facilities for luggage.

BRIEF DESCRIPTION OF THE DRAWINGS

The subject-matter of the invention is hereinafter explained in more detail by way of embodiment examples, which are represented in the attached figures, wherein:

FIG. 2 shows a plan view of a conveying tray of the conveying facility;

FIG. 3 shows a perspective view of a conveying tray;

FIG. 7 shows a perspective view from the delivery region of the conveying facility;

FIG. 8 shows a perspective view of an inclining mechanism in the delivery region;

FIG. 9 shows a perspective view of an embodiment of a conveying member of the conveying facility, obliquely from above;

FIG. 10 shows a view of the conveying member of FIG. 9 from the front;

FIG. 15 shows a view from the front upon a detail of the conveying facility according to FIG. 14.

DETAILED DESCRIPTION OF THE INVENTION

Figure 1:
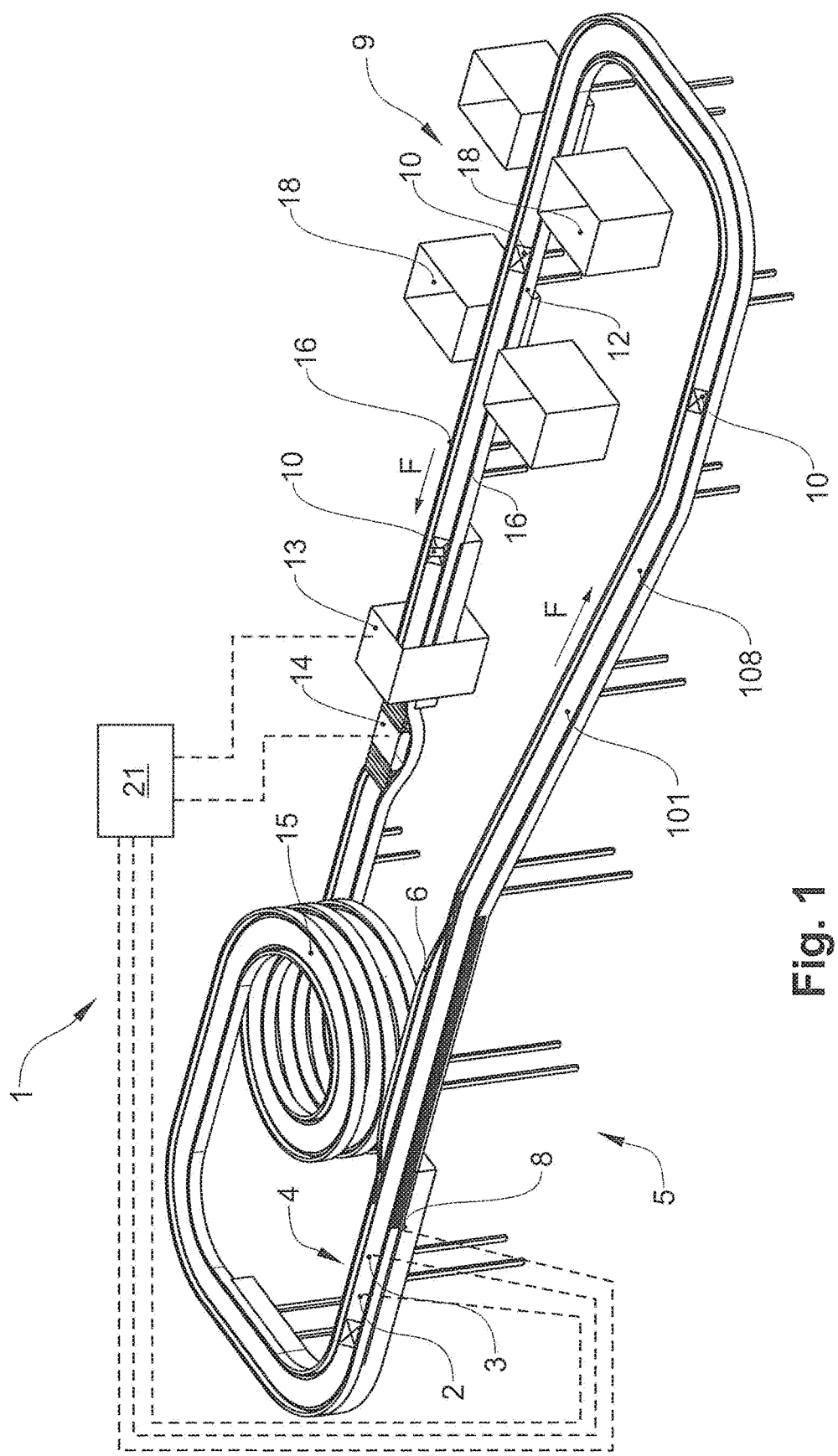
FIG. 1 shows a perspective view of a conveying facility according to the invention.

Basically, in the figures, the same parts are provided with the same reference numerals.

Certain features are not represented in the figures for the purpose of a better understanding of the invention. The embodiment examples, which are described hereinafter, are merely exemplary for the subject-matter of the invention and have no limiting effect.

FIG. 1 shows an embodiment example of a conveying facility 1 according to the invention. The conveying facility 1 is designed as a conveyor with a closed conveying stretch and includes a circulating conveying member 101 with an extensive conveying element 102. The extensive conveying element 102 forms a main surface 108, via which the conveyed item 20 is conveyed (see also FIGS. 9 to 14). The conveying member 101 is described in yet more detail below by way of FIGS. 9 to 14.

The conveying facility 1 includes conveying containers 10 in the form of conveying trays for receiving conveyed items 20, which lie on the conveying member 101 in a connection-free manner.

The conveying trays 10 each form a deepening 11 for receiving the conveyed items 20. The conveyed items 20 are held laterally thanks to the deepening 11 (see also FIGS. 2 and 3).

The deepening 11 has a continuous, ramp-like ascent towards the sides. This assists in the sliding of the conveyed items 20 out of the deepening 11 given an inclined conveying tray 10.

Furthermore, projecting guide elements 19, via which the conveying trays 10 can be guided along an inclining mechanism 6, which is yet described further below, are arranged on the short sides of the conveying trays 10. One or more guide elements 19 can be arranged on each side, in particular on a short side.

Furthermore, an information label, which carries information regarding the conveying tray, e.g., information for the identification of the conveying tray 10 or the tare weight of the conveying tray 10 for the purpose of computing the weight of the conveyed item 20, which is transported in the conveying tray 10 is attached to the conveying tray 10.

The conveying facility 1 forms a feed stretch 9, along which several feed stations 12 are arranged, at which feed stations conveyed items 20, in particular parcels, are manually removed from storage containers 18 and continuously deposited into the conveying trays 10, which are conveyed past on the conveying member 101. For this, the conveying member 101 is driven at a continuous or variable conveying speed.

The conveying trays 10 with the conveyed items 20 are conveyed on the conveying member 101 in the conveying direction F past a detecting device 13. The detecting device 13 is designed as an optical multi-side scanner, which searches the surface of the conveyed items 20 for identification information from several sides. The detected identification information is transmitted to a control device 21 for further processing.

Address data is determined in the control device 21 from the identification information. The procedure from detecting the identification information on the conveyed items 20 until the presence of address data can take half to one minute.

The conveying trays 10 with the conveyed items 20, subsequently to the detection device 13 are conveyed to a weighing device 14, by way of which the weight of the conveyed items 20 is determined.

The conveyed items 20 are conveyed along a spiral stretch 15 to a higher conveying level subsequently to the weighing device 14.

Amongst other things, the spiral stretch 15 serves for bridging the time until the address data concerning the respective conveyed items 20 has been determined by the control device 21. Specifically, the conveyed items 20 are not conveyed into the delivery region 5 until the address data of the conveyed items 20 has been determined or it has been ascertained that no address data could be determined for a conveyed item 20.

A straight-lined accumulation stretch 2 connects to the spiral stretch 15, along which accumulation stretch the conveyed items 20 are held back, i.e. buffered, until their release in the direction of the delivery region 5.

For this, considered in the conveying direction F, a release device 3 is provided at the end of the accumulation stretch 2, the release device being controlled by the control device 21 and by way of which the conveyed items 20 can be individually released out of the accumulation stretch 2 in the direction of the delivery region 5.

The accumulation stretch 2 consequently serves to buffer the conveyed items 20 upstream of the delivery region 5. The buffering of the conveyed items 20, on the one hand, is intended to ensure a controlled delivery of conveyed items 20 in the direction of the delivery region 5 and, on the other hand, the buffer is to ensure a regular resupply of conveyed items 20 which are to be fed to the delivery region 5.

Since the conveyed items 20 are stopped or delivered at a significantly lower speed along the accumulation stretch 2 in comparison to the conveying speed of the conveying member 101, means which decouple the conveying of the conveyed items 20 along the accumulation path 2 from the conveying speed of the conveying member 101 are provided. These means are yet described in more detail further below in connection with the description of the conveying member 101.

As already mentioned, a release device, by way of which the conveyed items 20 are individually released out of the accumulation stretch 2 are provided at the end of the accumulation stretch 2.

The conveyed items 20, which are released from the accumulation stretch 2, are conveyed into an acceleration stretch 4, which is arranged upstream of the delivery region 5 and along which the conveying items 20, are accelerated and delivered towards the delivery region 5 at a variable speed, which differs from the conveying speed of the conveying member 101.

For this, as yet explained in more detail further below, means that decouple the conveying of the conveyed items 20 along the acceleration stretch 4 from the conveying speed of the conveying member 101 are provided at the acceleration stretch 4.

The acceleration or the speed of the conveyed items 20 along the acceleration stretch 4 is controlled via the control device 21. The acceleration stretch 4 serves to accelerate the conveying trays 10 with the conveyed items 20 to the conveying speed of a tilt-tray sorter 60, which is designed as an outgoing conveyor and to bring them into cyclically synchronous conveying with the tilt-trays 62 of a tilt-tray sorter 61, which is designed as an outgoing conveyor and to which the conveyed items 20 are to be delivered.

This means that the conveying trays 10 of the feeding conveying facility 1 are accelerated and moved at a conveying speed along the acceleration stretch 4 in a manner such that these are conveyed in a cyclically synchronous or pace-synchronised manner with the tilt-trays 62 of the tilt-tray sorter 61, to the delivery region 5 and form so-called transfer pairings with the tilt-trays 62.

Transfer pairing means that considered in the conveying direction F, a conveying tray 10 of the feeding conveying facility 1 is arranged next to a tilt-tray 62 of the tilt-tray sorter 61, for the purpose of the delivery of the conveyed items 20.

The conveying track (conveying path) of the conveying trays 10 of the feeding conveying facility 1 and the conveying track of the tilt-trays 62 of the outgoing-conveying tilt-tray sorter 61 run parallel next to one another along the acceleration stretch 4. The conveying trays 10 of the conveying facility 1 and the tilt-trays 62 of the tilt-tray sorter 61 accordingly move along the acceleration stretch 4 in the same direction (see also FIG. 7).

An inclining mechanism 6, which moves the conveying trays 10 into a position that is laterally inclined considered in the conveying direction F, is arranged in the delivery region 4, for the purpose of delivery of the conveyed items 20 onto an outgoing conveyor 61. For this, the conveying tray 10 is lifted at the respective short side via a cam guide (see also FIGS. 7 and 8). Herein, the cam guide interacts with the guide element 19 on the short side of the conveying tray 10, the guide element having already been mentioned above. This means that the cam guide forms a guide path for the guide element 19.

Concerning this procedure, the conveying tray 10 is lifted from the conveying member 101, so that the conveying member 101, which continues its movement in the conveying direction F below the conveying tray 10, is no longer effective in conveying for the respective conveying tray 10 in the region of the inclining mechanism 6.

The second short side, which lies at a lower level and is opposite the lifted short side of the conveying tray 10 or the guide element 19 of the conveying tray 10 that is arranged on this short side, is brought into contact with a conveying drive 7 of the inclining mechanism 6 for the purpose of driving the conveying tray 10 through the transfer region 5 in the conveying direction F.

The conveying drive 7 includes a circulating conveying belt, which conveys the conveying trays 10 further along the inclining mechanism 6 in the conveying direction F, instead of the conveying member 101, which moves further below the conveying trays 10 in the conveying direction F.

The conveying track or path of the conveying trays 10 of the feeding conveying facility 1 and the conveying path of the tilt-trays 62 of the outgoing-conveying tilt-tray conveyor 61 run parallel next to one another in the delivery region 5.

The conveying trays 10 of the conveying facility 1 and the tilt-trays 62 of the tilt-tray sorter 61 accordingly move through the delivery region 5 in equal directions (see also FIG. 7).

As soon as the conveying trays 10 have now reached an adequate oblique position or inclination along the inclining mechanism 6, the conveyed item 10 slips out of the deepening 11 of the conveying tray 10 and slides into the adjacent tilt-tray 62 of the transfer pairing.

After delivery of the conveyed items 20 out of the conveying trays 10, these trays are moved along the inclining mechanism 6 again into a horizontal position via the cam guide and are again deposited on the conveying member 101, which moves past below the conveying trays 10. On depositing onto the conveying member 101, the conveying trays 10 leave the inclining mechanism 6 and from then on are again conveyed by the conveying member 101.

A diverter 8, which is connected to the control device 21, is arranged at the entry into the inclining mechanism 6 (see FIG. 8). The diverter 8 can be switched between two positions that permit the conveying trays 10 of the feeding conveying facility 1, 1' to be selectively conveyed via the obliquely positioning cam guide of the inclining mechanism 6 or continue to be conveyed lying on the conveying element 101—without an oblique position. Accordingly, also no conveyed item 20 is delivered from this conveying tray 10'.

For example, the conveying tray 10' can be conveyed past the inclining mechanism in a manner lying on the conveying element 101 if, for example, this includes no conveyed item or if the conveyed item 20, which is conveyed in the conveying tray 10' is not to be delivered.

This, e.g., can be the case if the address of the conveyed item 20 could not be determined due to the associated identification information on the conveyed item 20 not being able to be read out by the detection device 13 or due to it not being present or it being located on an underside of the conveyed item 20, which lies on the conveying member 101 and which is not accessible to the detection device 13.

Subsequent to the delivery region 5, the conveying trays 10 are conveyed along a ramp again to the lower conveying level of the feed stretch 9 and are conveyed back into the feed stretch 9.

A further accumulation stretch 17, along which the conveying trays 10 can be accumulated is formed downstream of the delivery region 5 and upstream of the feed stretch 9 considered in the conveying direction F. In this manner, the conveying trays 10, in a controlled and/or metered manner, can be released out of the accumulation stretch 17 into the feed stretch 9 where these are again manually charged with conveyed items 20. A new operating cycle can begin.

Figure 4:
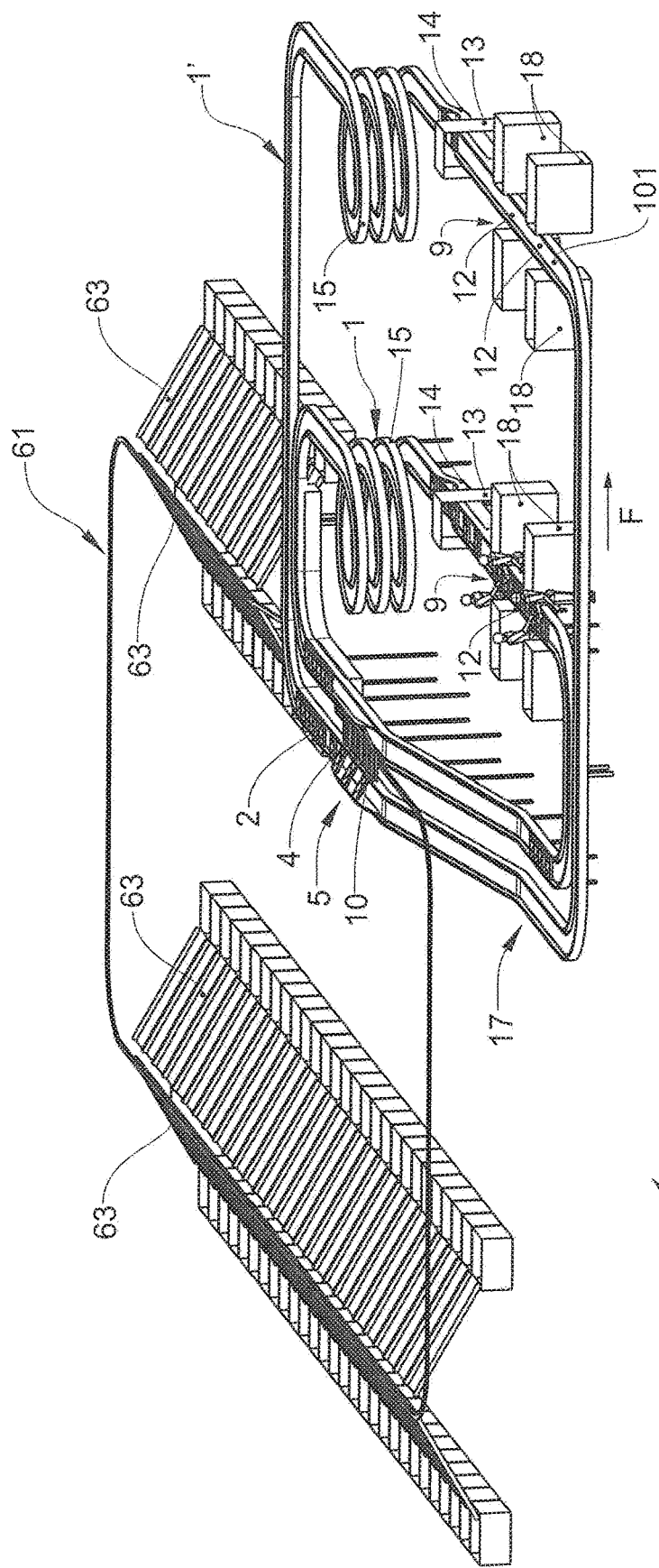
FIG. 4 shows a perspective view of a conveying system with a conveying facility according to the invention.
Figure 5:
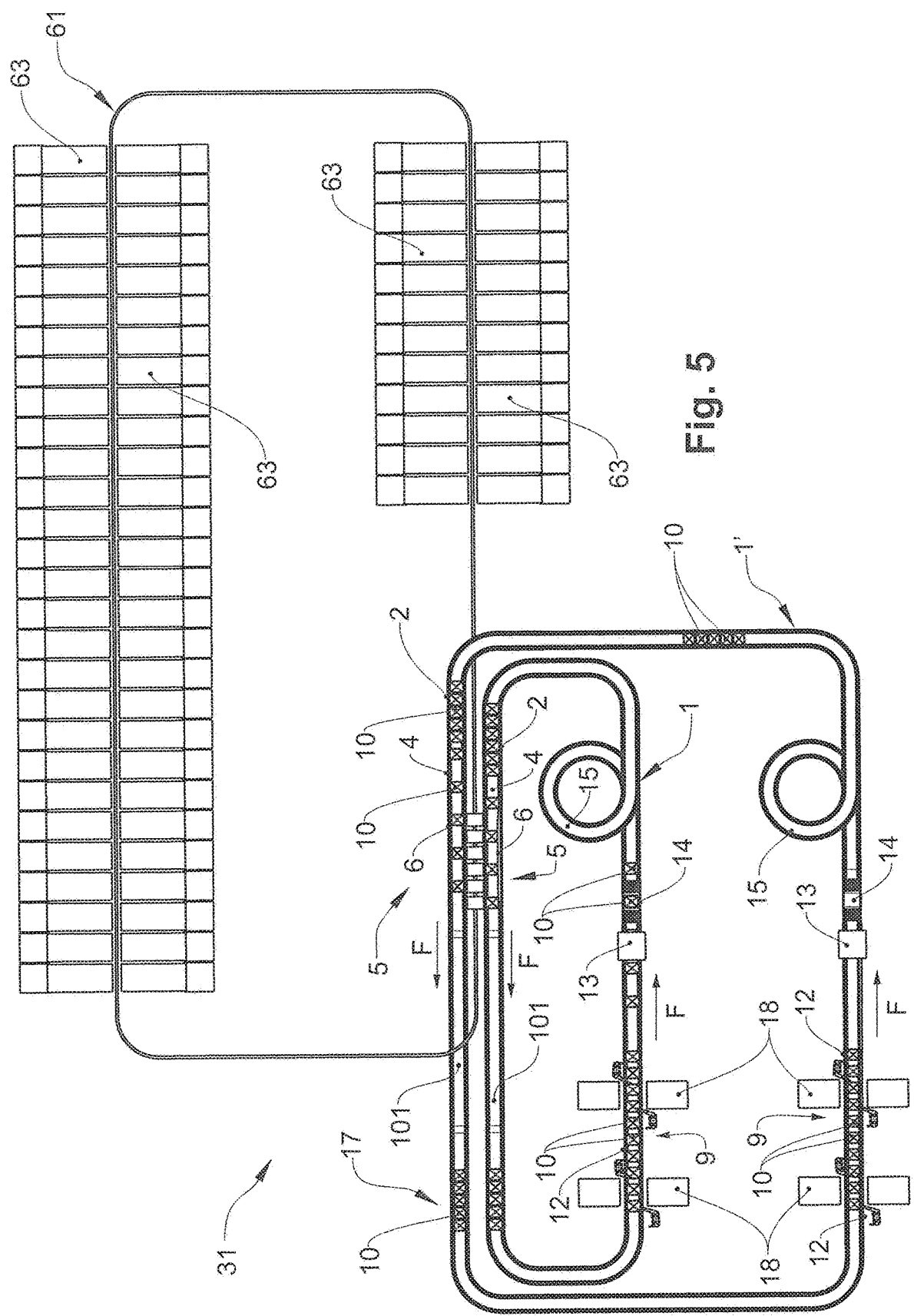
FIG. 5 shows a plan view of the conveying system according to FIG. 4.
Figure 6:
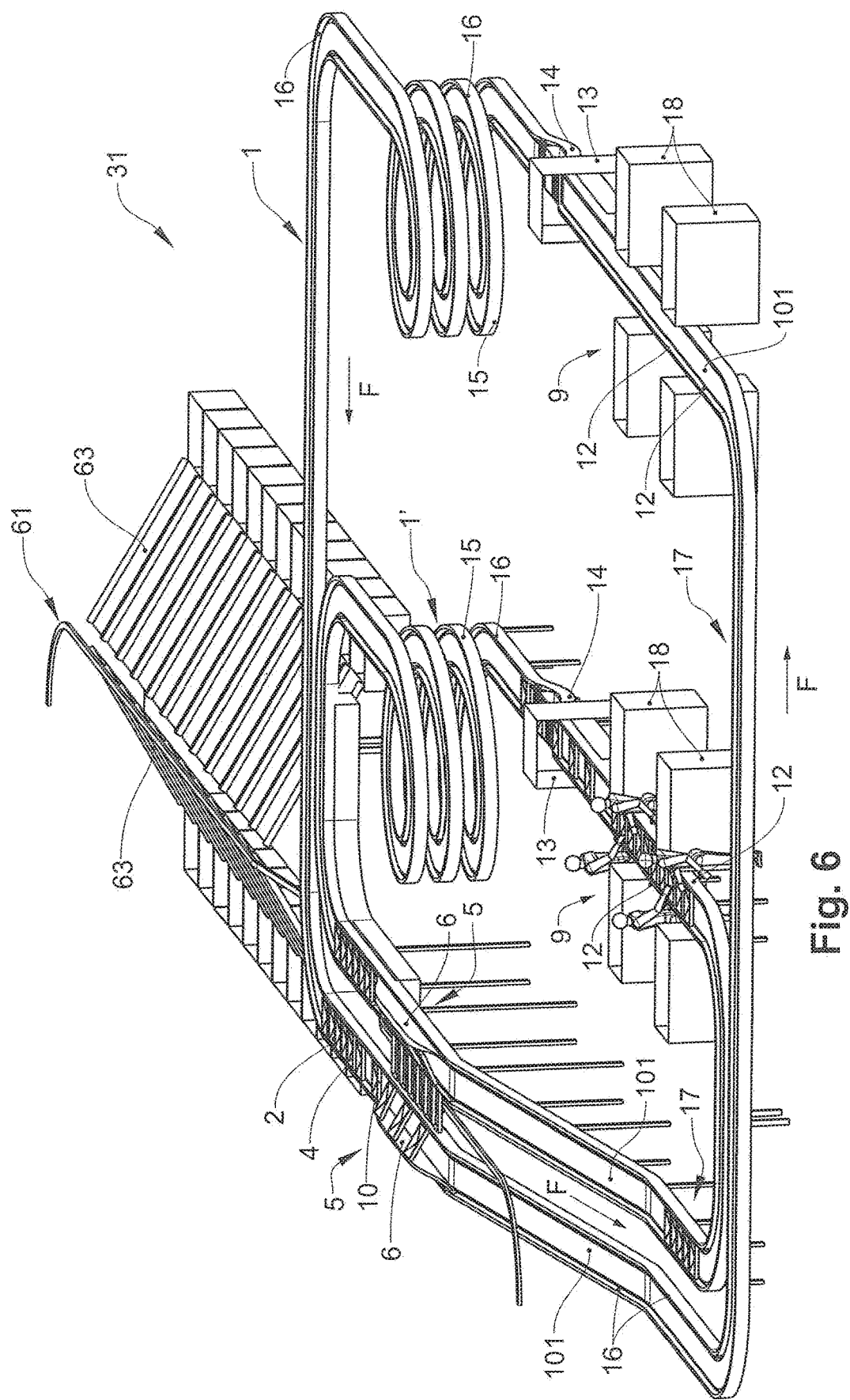
FIG. 6 shows a perspective detailed view of the conveying system according to FIG. 4, from the region of the conveying facility.

FIGS. 4 to 6 show a conveying system 31 in different views. The conveying system 31 includes two feeding conveying facilities 1, 1' of the type which is described above. This means that the two feeding conveying facilities 1, 1' basically have the same construction. However, the guidance of the conveying stretch of the two conveying facilities 1, 1' differs from one another.

Furthermore, the conveying system 31 includes an outgoing conveyor 61, which is designed as a tilt-tray sorter. The tilt-tray sorter 61 forms a circulating conveying stretch, along which the so-called tilt-trays 62 are moved for transporting the conveyed items 20. The tilt trays 62 are fastened to a conveying member, which is continuous in a chain-like manner and is not described in more detail here, at uniform distances to one another. The conveying member is driven and moves the tilt-trays 62 along the conveying stretch.

The tilt-trays 62 of the tilt-tray sorter 61 each include a joint, via which these, considered in the conveying direction F, can be pivoted to the side for the purpose of ejecting the conveyed items 20.

A multitude of ejecting stations 63 for the controlled ejection of the conveyed items 20 out of the sorter 61 according to defined sorting rules are arranged along the conveying stretch of the tilt-tray sorter 61.

The tilt-tray sorter 61 and the two feeding conveying facilities 1, 1' form a transfer region 5, which co-includes the delivery region 4 of the conveying facility 1 according to FIG. 1.

The conveying tracks of the tilt-tray sorter 61 and of the two feeding conveying facilities 1, 1' run parallel to one another in the transfer region 5 as well as along the acceleration stretches 4 of the feeding conveying facilities 1, 1', which are arranged directly upstream. The conveying track of the tilt-tray sorter 61 runs along the acceleration stretches 4 of the feeding conveying facilities 1, 1' as well as in the transfer region 5 between the conveying tracks of the two conveying facilities 1, 1'.

In the transfer region 4, the two conveying facilities 1, 1' each include an inclining mechanism 6, which are described above and which are arranged lying opposite one another in a manner such that the conveying trays 10 of the feeding conveying facilities 1, 1' are inclined towards one another, i.e., towards the conveying track of the tilt-tray sorter 61, which runs therebetween (see FIG. 7).

In this manner, the tilt-trays 62 of the tilt-tray sorter 61 can be charged or fed with conveyed items from two sides. This means that every second tilt tray 62 of the tilt-tray sorter/outward conveyor 61 is fed from a first side and every second tilt-tray 62 of the tilt-tray sorter/outward conveyor 61, which is offset by one is fed with a conveyed item 20 from a second side in normal operation.

This arrangement is based on the fact that the tilt-tray sorter 62 can be operated with about double the processing capacity compared to the feeding conveying facilities 1, 1', which need to be fed with the conveyed items 20 in a manual manner, as mentioned.

In the present case, the tilt-trays 61 of the tilt-tray sorter 61 are accordingly driven at about twice the speed as the conveying member 101 of the feeding conveying facility 1, 1'.

The processing capacity of the tilt-tray sorter 61 can be fully utilised due to the delivery of conveyed items 20 from two feeding conveying facilities 1, 1', which are operated in parallel.

Accordingly, in the transfer region 5, the conveying trays 10 of each conveying facility 1, 1' are paired with every second tilt-tray 62 of the tilt-tray sorter 61. Consequently, in the transfer region 5, the conveying trays 10 of the feeding conveying facility 1, 1' each have double the distance to one another compared to the tilt-trays 62.

The conveying trays 10 are accordingly accelerated subsequently to the accumulation stretch 2 along the acceleration stretch 4 for forming the aforementioned arrangement in the transfer region 5 and are brought into a cyclically synchronous conveying with the tilt-trays 62 whilst forming transfer pairings.

FIGS. 9 to 13 show an embodiment example of a conveying member 1 of a conveying facility 1 according to the invention. FIGS. 14 and 15 show parts of an embodiment example of a conveying facility 1 according to the invention.

FIG. 9 shows a subassembly of a conveying member 101 as is applied in the conveying facility 1, 1' according to FIGS. 1 to 8. The subassembly includes a plate-like conveying element 102, which has a width transverse to the conveying direction F of about 40 cm.

The conveying element 102 is designed in a stepped manner at its upper side. One step 116 of the conveying element 102 is designed with an abrupt bend, thus in a v-shaped manner, transversely to the conveying direction F and at the side of the conveying element 102, which lies at the top connects a lower-lying surface and a higher-lying surface, wherein the higher-lying surface is part of a main surface 108 of the conveying member. The item 20 to be conveyed can come to lie upon this main surface 108. However, as a rule, the item 20 to be conveyed comes to lie on the conveying element 102 exclusively on the rollers 105.

The lower-lying surface of the upper side of the conveying element 102 is at least partly covered by a part of an adjacent conveying element 102. The subassembly is designed such that the plate-like conveying elements 102 of adjacent subassemblies can overlap. A main surface 108, which extends along the conveying member 101, is formed by way of this.

In particular, the conveying member 101 is part of a plate-chain conveyor.

The v-shape of the step 116 herein permits a rotation, which is aligned transversely to the conveying direction F (a rotation which lies in a plane containing the mains surface 108, a so-called side-arc) of adjacent subassemblies relative to one another. The step 116 in the conveying element 102 is designed in an oblique manner in the conveying direction F and has an inclination of 45 degrees disregarding rounded edges.

The conveying element 102 includes two openings in the main surface 108, through which openings a roller 105 extends upwards through the conveying element 102 from below the main surface 8. The openings lie roughly in the middle of the conveying element 102 considered in the conveying direction F. Both openings are distributed over the width of the conveying element 102 transversely to the conveying direction F. The rollers 105 therefore divide the conveying element 2 into three sections transversely to the conveying direction F.

FIG. 10 shows a view of the subassembly from the front, thus considered counter to the conveying direction F. The two rollers 105 are each encompassed by a roller mechanism 103 and are in an arrested position. Both roller mechanisms 103 are each arranged below the main surface 8. Additionally to a roller 105, each of the two roller mechanisms 103 includes a roller holder 104 and an arresting appliance 110. The roller holder 104 here includes two pivot holders 109, which hold the pivot 106 of the roller 105 at both sides of the roller 105.

Figure 11:
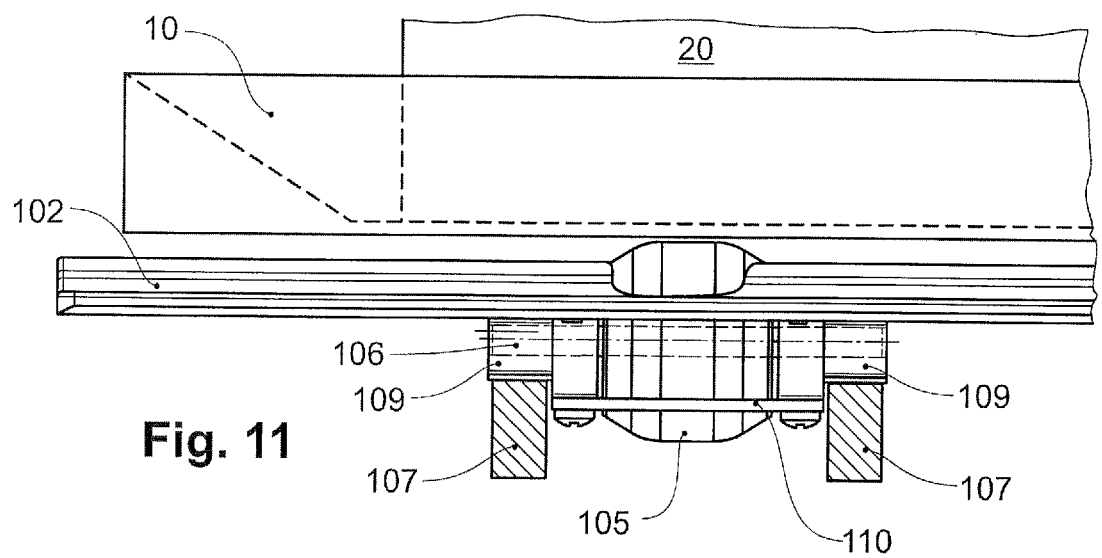
FIG. 11 shows a detail of a view of the conveying member of FIG. 9 from the front, with a roller in the freewheel position.

A detail of a view of the conveying member element 101 from the front is represented in FIG. 11, wherein a roller 105 is situated in the freewheel position. The conveyed object 20 is also represented in FIG. 11 and this is arranged in a conveying tray 10, which lies on the running surface of a roller 105. The conveying tray 10 is conveyed by way of contact with the rollers 105. However, the conveying tray 10 can also be in contact with the main surface 108 and, for example, at least partly lie on this.

The freewheel position of the roller 105 in FIG. 11 is achieved by way of the two actuating means 107, which are designed as separate cams supporting the pivot holders 109 of the roller 105 from below and pressing these upwardly onto the upper stop. The pivot holders 109 therefore lie on the actuating means 7 and by way of this are pressed upwards against the conveying element 102, which for this has formed upper stops. In this position, the roller 105 in FIG. 11 is situated in the freewheel position, thus can freely rotate.

The conveying trays 10 can therefore be moved relative to the conveying member 101 with a low force effort via the rollers 105, which are in the freewheel position and which act as linear bearings of the conveying member 101. The conveying member 101, for example, can be moved below the conveying trays 10 with the conveyed item 20, without a large force being applied upon the conveying trays 20. In other words, a transmission of a movement energy of the conveying member 101 onto the conveying trays 10 is negligible given rollers 5 in the freewheel position.

Accordingly, the rollers 105 of the conveying member 101 are held in a freewheel position along the accumulation stretches 2, 17, so that the conveying member 101 can be moved through below the conveying trays 10, without these applying a noticeable driving or dragging force upon the accumulated conveying trays 10. High friction forces between the conveying member 101 and the accumulated conveying trays 10 are prevented by way of this.

Figure 12:
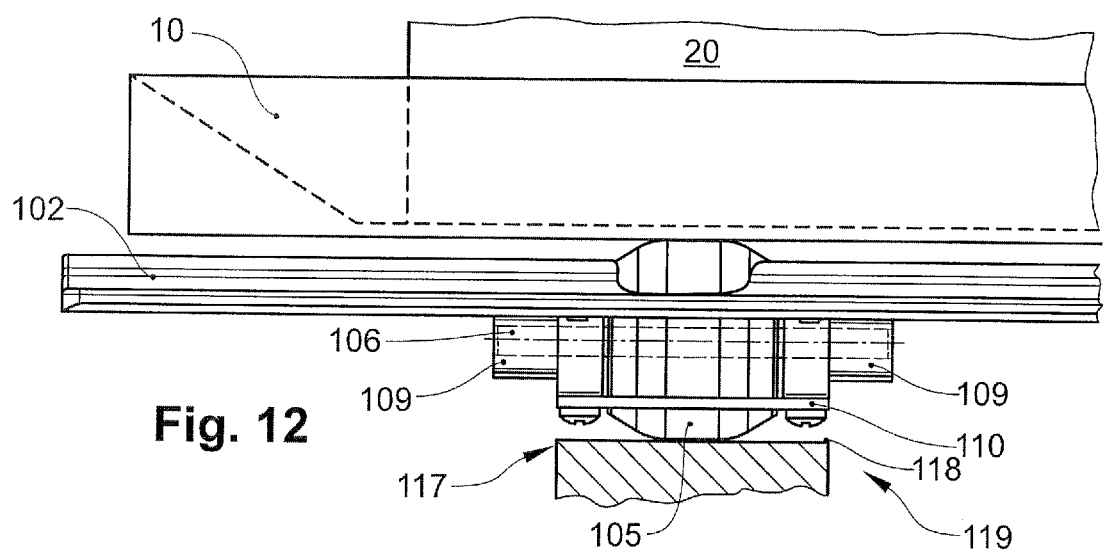
FIG. 12 shows a detail analogous to FIG. 11, with the roller in drive position.

A detail is represented in FIG. 12 analogously to FIG. 11, but with the roller 105 in the drive position. In contrast to FIG. 11, FIG. 12 includes a roll guide 117. The roll guide 117 although likewise being designed as a cam, however this cam on its side, which is directed to the top includes a roll surface, on which the running surface of the roller 105 lies from above. The roll guide 117 therefore supports the roller 105 from below and drives the roller 105 by way of this, the roller together with the conveying member 101 being moved beyond the roll guide 117.

The roll surface is plane and is aligned parallel to the main surface 108. The roll guide 117 thereby engages on the roller 105 at the point that is furthest from the roller pivot 106, just as the conveying trays 10 on the opposite side of the roller 105. The transmission ratio of the drive is therefore 1, which means that the speed between the roll guide 117 and the conveying member 101 is as equally large as the speed between the conveying trays 10 and the conveying member 101. The conveying tray 10, driven by the roller 105, therefore moves twice as fast relative to the roll guide 117 than the conveying member 101.

The roll guide 117, as is shown in FIG. 12, can include a roll element 118, e.g. in the form of a circulating drive belt 118. The embodiments above therefore only relate to a non-driven roll guide.

In the case of a driven roll element 118, the rollers 105 can be driven at an arbitrary speed and be driven in the conveying direction of the conveying member 101 as well as counter to this, so that the conveying trays 10, which lie on the rollers 105, have a greater or lower speed compared to the conveying member 101 or can even be conveyed in a conveying direction, which is opposite to the conveying direction F of the conveying member 101.

Basically, the conveying trays 10 can be operated with an actively driven roll guide 117 at a conveying speed that is independent of the speed of the conveying member 101.

Together, the roll guide 117, the roll element 118 and the roller 105 can be considered as an acceleration device 119.

The roll guide 117 is applied along the acceleration stretch 4 of the feeding conveying facility 1, 1', along which acceleration stretch the conveying trays 10 are accelerated out of the accumulation stretch 2, as has already been described in detail above.

Concerning the present embodiment of the conveying member 101, the spatial position of the roller pivot 106 and therefore also of the roller 105 is identical in the freewheel position and the drive position, specifically with the pivot holders 109 bearing on the upper stop. However, the drive position can also lie further to the bottom than the freewheel position. The freewheel position in turn, in another embodiment and/or application can however also lie further to the bottom than the drive position. However, neither in the drive position nor in the freewheel position can the running surface of the roller 105 come into contact with the arresting appliance 110.

Figure 13:
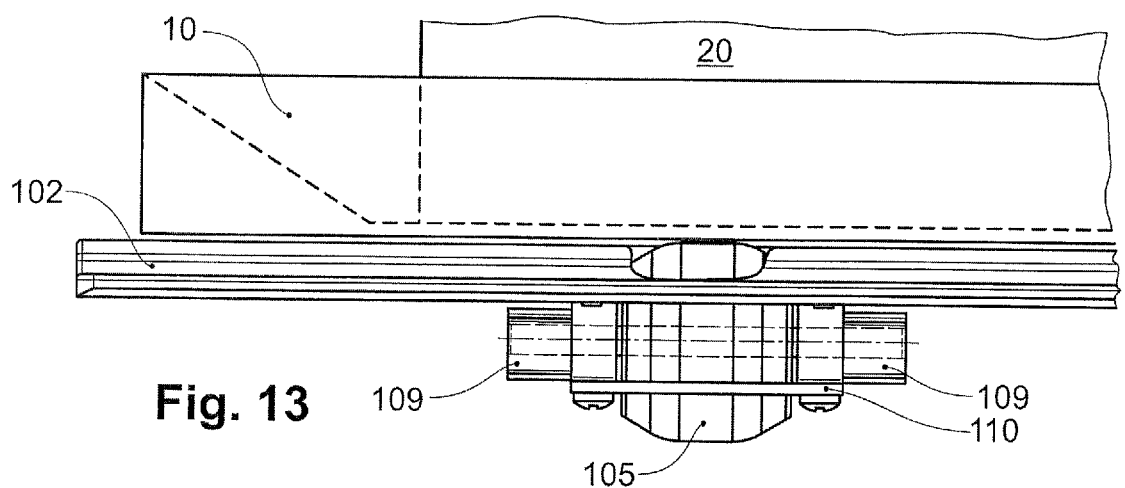
FIG. 13 shows a detail analogous to FIG. 11, with the roller in the arrested position.
Figure 14:
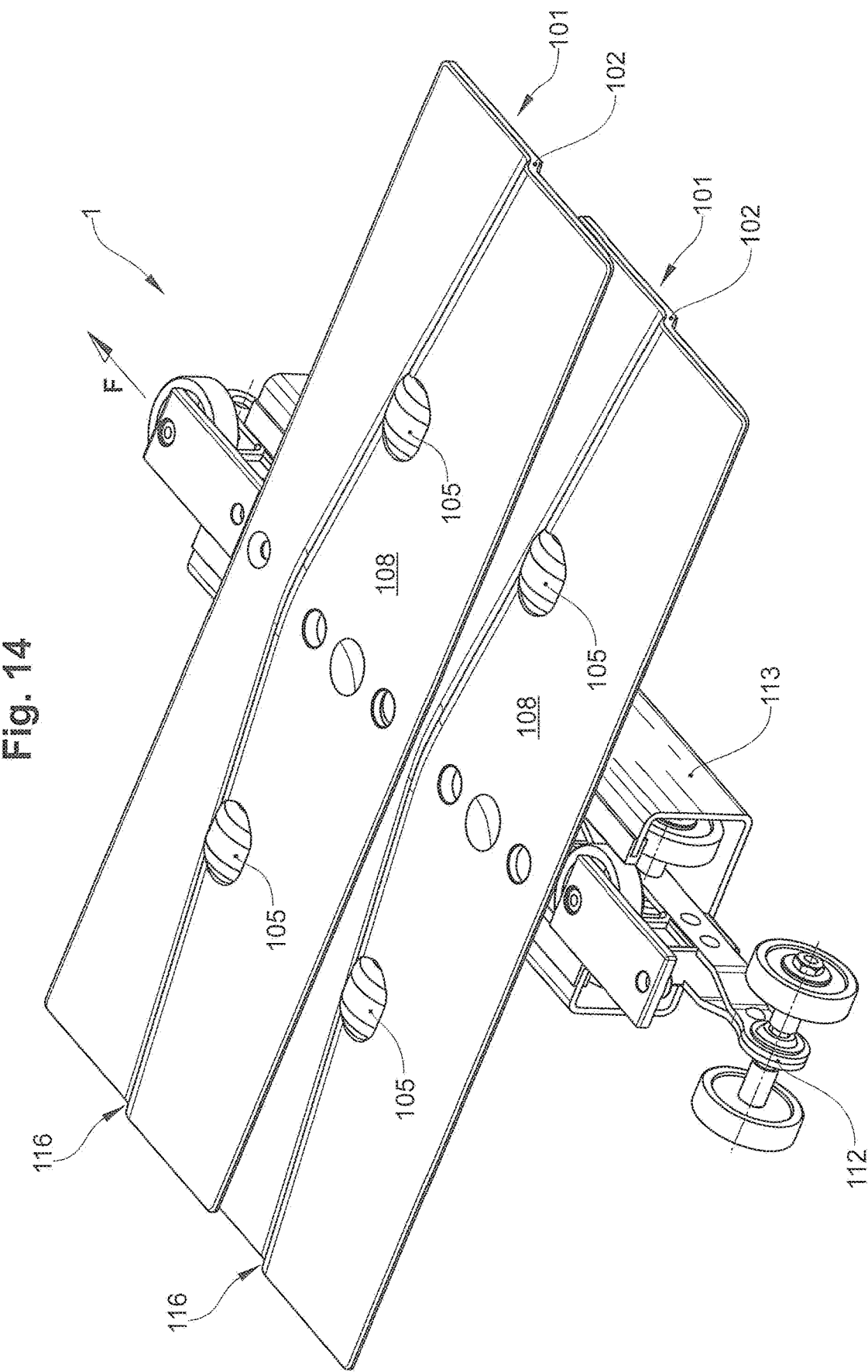
FIG. 14 shows a perspective view of a detail of the conveying facility including the conveying member according to FIG. 9, from above.

FIG. 13 shows a detail analogously to FIG. 11. Herein, the roller 105 is in the arrested position. The arrested appliance 110 serves as a lower stop for the roller 105, by way of the running surface of the roller 105 being able to lie on this in the direction of gravitational force.

The arresting appliance 110 is designed as a metal plate that includes an opening. The shaping of this opening of the arresting appliance 110 and its dimensioning is such that the roller 105 can project into the opening and the running surface of the roller 105 can come into a contact fit with edges of the opening of the arresting appliance 110. If the roller 105 is in the arrested position, then the running surface of the roller 105 lies on the arresting appliance 110 in the direction of gravity and the roller 105 projects party through the opening of the arresting appliance 110. The arresting appliance 110 is fastened to the conveying element 102 in a rigid and stationary manner and as a lower stop limits the movement of the roller 105 and thus also of the roller pivot 106 in the direction of gravity. In the present case, the arresting appliance 110 is screwed on supports that are formed by the conveying element 102, and is arranged parallel to the main surface 108.

The roller pivot 106 is designed as a metal pin, about which the roller 105 is mounted in a freely rotating manner. The roller pivot 106 projects out of the roller 105 at both sides of the roller 105, then runs through an elongate opening that is formed by the conveying element 102 and designed as a linear sliding guide, and at both sides ends in a pivot holder 109. The roller pivot 106 is connected rigidly and thus in a rotationally fixed manner to the pivot holders 109. The linear sliding guide, which is formed by the conveying element 102, guides the roller pivot 6 orthogonally to the main surface 108. The conveying element 2 and the pivot holders 109 are manufactured of plastic.

The arresting appliance 110 thus serves as a lower stop for the roller 105, by way of the running surface of the roller 105 being able to lie thereon in the direction of gravity. The arresting appliance 110 acts upon the roller 105 in a self-arresting manner due to the weight of the roller and/or of the conveying trays 10 or of the conveyed item 20 which is conveyed in these. The roller pivot 106 can be moved in the direction of the main surface 108 by way of the linear sliding guide, wherein the conveying element 102 has formed an upper stop for this movement, on which stop the pivot holders 109 can come to abut. The conveying element 2 thus forms an upper stop for the pivot holders 109 and thus indirectly for the roller pivots 106 and the rollers 105, and the rollers 105 are situated in the freewheel position in this position. The rollers are in the arrested position when the rollers 105 lie on the arresting appliance 110 on the lower stop.

The pivot holders 109, the linear sliding guide for the roller pivot 106, formed by the conveying element 102, and the upper stops for the pivot holders 109, formed by the conveying element 102, are encompassed by the roller holder 104.

The rollers 105 have a crowned shape. The cross section of the rollers 105 (thus a section along the roller pivot 106)

therefore has a convex shape, wherein the running surface of the rollers 105 is somewhat flattened. The running surfaces of the rollers 105 are rubberised, and the rollers 105 themselves consist of plastic.

In FIG. 13, the roller 105 now lies on the arresting appliance 110 and is in the arrested position. The arrested position is the position of the roller 105, which lies furthest to the bottom. The roller 105 is pressed into the arresting appliance 10 by way of the weight of the roller 5 and of the conveyed object 20 and this appliance thus functions in a self-arresting manner.

If therefore no actuating means or roll guides act upon the roller mechanism 103, the rollers 105 are located in the arrested position, particularly if these are loaded by a conveying tray 10.

Since the rollers 105 in particular include a running surface with a high coefficient of friction, these rollers act as catches for the conveying trays 10 in the arrested position.

Consequently, the rollers 105 are in the arrested position along conveying stretch sections, in which the conveying trays 10 are to be conveyed at the speed of the conveying member 101. This is the case for example along the feed stretch 9.

FIG. 14 shows a perspective view from above onto a detail of a conveying facility 1, 1' according to the invention which includes a conveying member 101 according to the invention. The conveying member 101 includes a plurality of subassemblies each with an extensive conveying element 101 and roller mechanisms 103, which are attached thereon and which have rollers 105. The conveying member 101 further includes a drive chain 112, on which the mentioned subassemblies are fastened via the conveying elements 102. For this, the conveying elements 102 are each rigidly fastened to an individual link of the drive chain 112. The drive chain 112 is led through a chain channel 113, which partly surrounds the drive chain 112 and encompasses it in a c-shaped manner. The chain channel 113 thus forms a chain guide.

A view from the front onto a section of the conveying facility 1, 1' of FIG. 14 is represented in FIG. 15. In FIG. 15, the rollers 105 are represented in the drive position, wherein a roll guide, along which the rollers 105 roll is positioned below the rollers 105.

The invention claimed is:

1. A conveying facility with a drivable conveying member that forms a sheet-like main surface that faces the conveyed item and defines a conveying stretch, and which comprises at least one conveying element that forms at least a part of the main surface,
wherein the conveying member comprises rollers, which via roller holders, are rotatably mounted on the at least one conveying element about roller pivots and can selectively assume the state of a freewheel position, an arrested position or a drive position, and the conveying facility comprises at least one conveying container that lies on the conveying member in a connection-free manner,
wherein the rollers project at least partly beyond the main surface of the conveying element, so that the at least one conveying container lies on the rollers;
wherein the conveying facility along the conveying stretch forms a delivery region with a delivery device for delivering conveyed items to a take-over appliance.

2. The conveying facility according to claim 1, wherein the roller holders and the rollers are each part of a roller mechanism, wherein the different states of the rollers are created by active elements that act upon the roller mechanism.

3. The conveying facility according to claim 2, wherein the roller holders and the rollers together with the active elements form a movement mechanism, with which the at least one conveying container is movable relative to the conveying member.

4. The conveying facility according to claim 1, wherein the rollers are each movable between at least two spatially different positions by way of active elements, in which positions the rollers assume different states from the group of states comprising the arrested position, the freewheel position and the drive position.

5. The conveying facility according to claim 4, wherein the rollers are each movable perpendicularly to the main surface between at least two positions by way of the active elements.

6. The conveying facility according to claim 1, wherein the conveying facility forms at least one accumulation stretch for buffering conveying containers and the rollers are in a freewheel position along the accumulation stretch.

7. The conveying facility according to claim 6, wherein actuators, by way of which the rollers can be moved into the freewheel position or are held in the freewheel position, are arranged along the accumulation stretch.

8. The conveying facility according to claim 6, wherein subsequently to the accumulation stretch in the conveying direction, the conveying containers are individually released out of the accumulation stretch.

9. The conveying facility according to claim 1, wherein the conveying facility forms an acceleration stretch, along which the rollers can be driven via a roll guide.

10. The conveying facility according to claim 9, wherein the acceleration stretch is arranged upstream of the delivery region considered in the conveying direction.

11. The conveying facility according to claim 6, wherein the accumulation stretch is formed between the feed stretch and the delivery region considered in the conveying direction.

12. The conveying facility according to claim 9, wherein the conveying containers which lie on the conveying member are movable along the acceleration stretch via the rollers, at a speed that is different from a conveying speed of the conveying member.

13. The conveying facility according to claim 9, wherein the roll guide comprises a roll element that is actively drivable in the conveying direction via a drive and on which the rollers roll.

14. The conveying facility according to claim 13, wherein the roll element is variably driveable via a control device.

15. The conveying facility according to claim 9, wherein the delivery device comprises an inclining mechanism for inclining conveying containers, said inclining being lateral when considered in the conveying direction.

16. The conveying facility according to claim 15, wherein the inclining mechanism at least partly lifts the conveying containers from the conveying member.

17. The conveying facility according to claim 15, wherein the conveying containers can be conveyed through the inclining mechanism above the conveying member.

18. The conveying facility according to claim 15, wherein the inclining mechanism comprises a conveying drive, by way of which the conveying containers can be conveyed in the conveying direction.

19. The conveying facility according to claim 15, wherein the delivery device comprises a diverter that interacts with a control device and via which the conveying containers can be selectively fed to the inclining mechanism or conveyed further on the conveying member.

20. The conveying facility according to claim 1, further comprising an additional delivery device, in which all conveying containers which have not yet been emptied are emptied.

21. The conveying facility according to claim 1, wherein the conveying facility forms a feed stretch with a feed device, in which the conveying containers can be fed with conveyed items.

22. The conveying facility according to claim 21, wherein the feed device comprises at least one feed station.

23. The conveying facility according to claim 21, wherein the rollers are located in an arrested position along the feed stretch and thus form catches for the conveying containers.

24. The conveying facility according to claim 1, wherein the conveying facility comprises a detecting device for detecting identification information on the conveyed item.

25. The conveying facility according to claim 1, wherein the conveying facility comprises a weighing device for weighing the conveyed items.

26. The conveying facility according to claim 1, wherein the conveying facility forms a spiral stretch and the rollers of the conveying member act as catches along the spiral stretch.

27. The conveying facility according to claim 1, wherein the conveying facility forms a closed conveying stretch.

28. The conveying facility according to claim 1, wherein the conveying facility forms side guides laterally of the conveying member as considered in the conveying direction.

29. The conveying facility according to claim 1, wherein the conveying facility is a sorter and forms a plurality of delivery regions that are arranged successively along the conveying stretch in the conveying direction.

30. A conveying system comprising the conveying facility according to claim 1 and a take-over appliance, wherein the conveying facility is designed as a feed conveyor of the take-over appliance.

31. The conveying system according to claim 30, wherein the conveying facility and the take-over appliance form a transfer region for transferring conveyed items from the conveying facility onto the take-over appliance.

32. The conveying system according to claim 30, wherein the take-over appliance is a further conveying facility.

33. A method for the delivery of conveyed items from a conveying facility according to claim 1, wherein the conveying containers that lie on the conveying member are buffered along an accumulation stretch, released individually into an acceleration stretch and/or accelerated in a manner differing from the conveying speed of the conveying member.

* * * * *